United States Patent
Froncioni

(10) Patent No.: US 11,724,438 B2
(45) Date of Patent: Aug. 15, 2023

(54) METHOD AND SYSTEM FOR STRETCHING A TUBULAR MATERIAL, OVER A MANDREL

(71) Applicant: Steer Medical Inc., Westmount (CA)

(72) Inventor: Michael J. Froncioni, St-Lazare (CA)

(73) Assignee: Steer Medical Inc., Westmount (CA)

( * ) Notice: Subject to any disclaimer, the term of this patent is extended or adjusted under 35 U.S.C. 154(b) by 242 days.

(21) Appl. No.: 17/191,949

(22) Filed: Mar. 4, 2021

(65) Prior Publication Data

US 2021/0291428 A1    Sep. 23, 2021

Related U.S. Application Data

(60) Provisional application No. 62/993,161, filed on Mar. 23, 2020.

(51) Int. Cl.
| | | |
|---|---|---|
| *B29C 55/26* | (2006.01) | |
| *B29C 55/22* | (2006.01) | |
| *B29L 31/00* | (2006.01) | |
| *B29K 27/18* | (2006.01) | |

(52) U.S. Cl.
CPC .............. *B29C 55/26* (2013.01); *B29C 55/22* (2013.01); *B29K 2027/18* (2013.01); *B29L 2031/7542* (2013.01)

(58) Field of Classification Search
CPC ......... B29C 55/22; B29C 55/26; B29C 55/00; B29K 2027/18; B29L 2031/7542
See application file for complete search history.

(56) References Cited

U.S. PATENT DOCUMENTS

| | | | | |
|---|---|---|---|---|
| 5,780,073 | A * | 7/1998 | Chen .................. | A61M 25/0068 425/384 |
| 6,176,698 | B1 * | 1/2001 | Grantz .................... | B29C 33/42 249/117 |
| 6,436,056 | B1 * | 8/2002 | Wang .................. | A61M 25/104 600/585 |
| 9,296,165 | B1 * | 3/2016 | Henson .................... | B29C 61/08 |
| 9,844,651 | B2 * | 12/2017 | Maeda .................... | B29C 49/22 |
| 2001/0052660 | A1 * | 12/2001 | Hudgins ........... | A61M 25/1029 264/515 |
| 2006/0182913 | A1 * | 8/2006 | Bertolino ................ | B29C 49/14 428/35.9 |
| 2010/0025894 | A1 * | 2/2010 | Kleiner ................... | B29C 61/04 264/528 |
| 2020/0338323 | A1 * | 10/2020 | Wesselmann ........... | B29C 49/46 |

* cited by examiner

*Primary Examiner* — Jeffrey M Wollschlager
(74) *Attorney, Agent, or Firm* — Teitelbaum & Bouevitch; Neil Teitelbaum

(57) ABSTRACT

A method and system for stretching a length of Teflon (PTFE) tubing where a mandrel is fully inserted therein requires firmly supporting and tensioning the PTFE tubing at ends thereof and grabbing the supported tubing at two adjacent locations at the center thereof and sliding and gripping with grippers from the center towards the two ends thereby stretching and pulling the length of PTFE tubing.

6 Claims, 6 Drawing Sheets

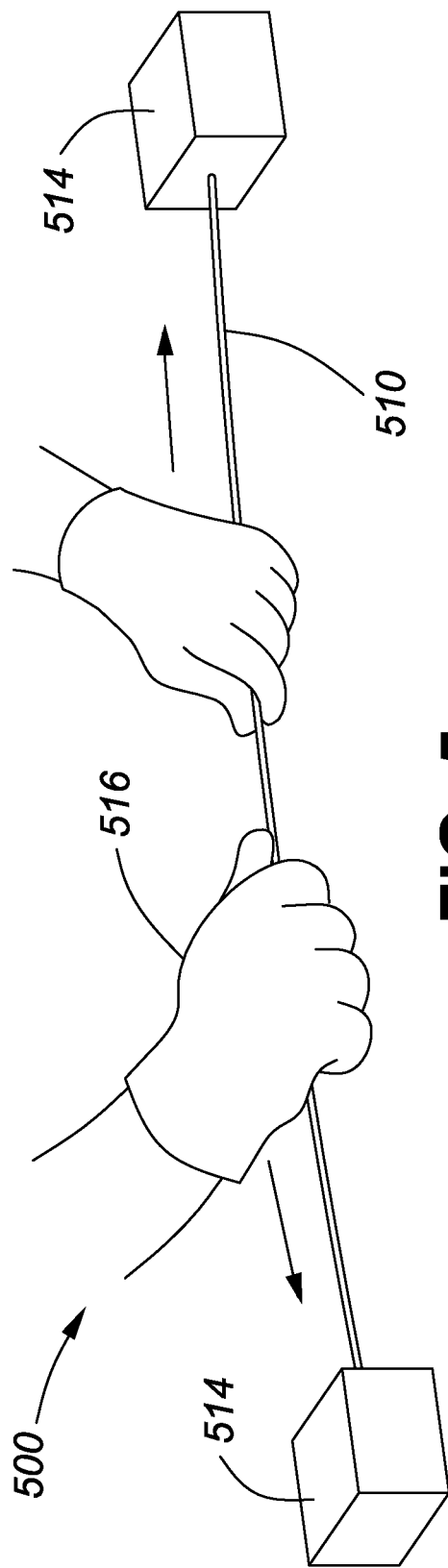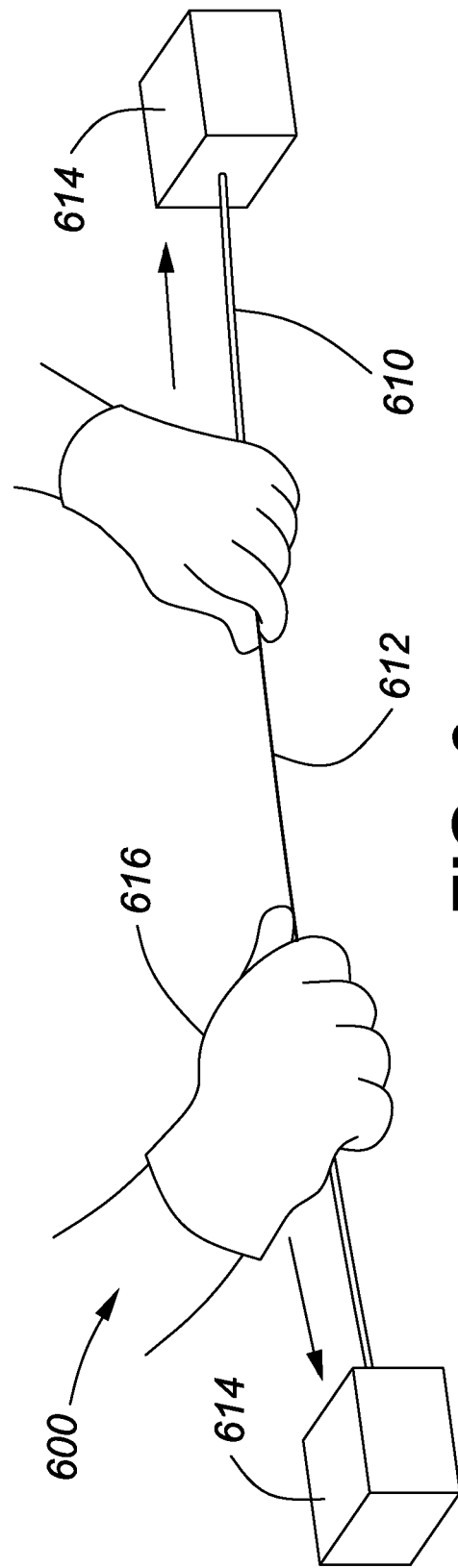

METHOD AND SYSTEM FOR STRETCHING A TUBULAR MATERIAL, OVER A MANDREL

REFERENCE TO RELATED APPLICATION

This application claims priority from U.S. Provisional Application No. 62/993,161, entitled "METHOD AND SYSTEM FOR STRETCHING A TUBULAR MATERIAL OVER A MANDREL", filed on Mar. 23, 2020, and incorporated herein by reference in its entirety.

FIELD

This invention relates generally to a system and method of drawing down, necking, or stretching a tubular material over a mandrel to form the base structure of a shaft, for example for use in manufacturing of a medical device shaft, used for performing minimally invasive, interventional cardiology, a surgical or other precision instruments.

Most shafts used in medical devices are either manually reflowed or extruded. Shafts that contain marker bands or pull wire rings and pull wires have been typically manually reflowed in multiple phases. Simpler shafts can be extruded in long lengths but new techniques are being developed to reflow complex shafts in one pass. Extrusion is much less costly compared to reflow techniques but has limitations for more complex catheter shafts.

Reflowed shafts are manufactured on plain mandrels or profiled mandrels that act as molds. These mandrels are used to control the inner diameter (ID) of the shafts as well as any lumens or steps that are required for steerability. Mandrels must be regularly inspected for nicks and scratches and maintained in good condition. Typically, mandrels are polished to a high degree so as to prevent irregularities on the ID that can lead to marks or blemishes and subsequently create tears on the Teflon layer.

When producing shafts for medical use, such as in catheters, mandrels are inspected for nicks and scratches or burrs. In the absence of blemishes, they are wiped down with isopropyl alcohol to remove any residual particles. Polytetrafluoroethylene (PTFE) tubing or liner as it is often referred to, is typically used as a base material in a reflow process. PTFE is also known as Teflon, which is a semi-crystalline thermoplastic. PTFE has a low coefficient of friction, is relatively temperature stable, is considered highly chemically resistant, UV resistant, good toughness but low mechanical strength. It can be purchased as a translucent or opaque material.

Chemically etched PTFE was developed to increase the surface energy and adhesion properties. Maintaining the etched surface when stretching lengths of PTFE requires considerable care in not overstretching and maintaining relatively uniform force on the length being stretched.

Machines have been developed which simply clamp ends of a length of PTFE tubing, however by doing so, the inner diameter is often not uniformly maintained, the presence of folds can occur or the PTFE is over stretched and adhesion properties are reduced.

It is an object of this invention to provide a method and system for substantially uniformly stretching a length of tubing gradually without having to heat the PTFE tubing so that the inner diameter along a substantial portion of its length remains uniform. Heating the tubing can degrade the adhesion properties.

It is a further object of this invention to provide a method and apparatus for stretching a length of tubing so that the inner diameter along a substantial portion of its length remains uniform and wherein any substantial tearing or pin holes and whitening within the tubing after pulling is absent.

SUMMARY

In accordance with an aspect of this disclosure there is provided, a method of stretching a length of tubing comprising:
placing a mandrel into a length of tubing so that the mandrel is fully within tubing;
securing a first end region of the tubing within a first movable holder;
securing a second end region of the tubing within a second holder so that the tubing is held taut along a longitudinal axis between the holders as the length of tubing is stretched;
grabbing the tubing at a first location about a mid-region of the tubing with a first grabber
grabbing the tubing at a second location about the mid region of the tubing with a second grabber
sliding the first grabber a distance across the tubing in a first direction towards the first movable holder while simultaneously applying enough frictional force upon the tubing to longitudinally stretch it so that the length of the tubing has increased; and,
sliding the second grabber a distance across the tubing in a second direction towards the second holder while simultaneously applying enough frictional force upon the tubing to longitudinally stretch it so that the length of the tubing has increased.

In accordance with another aspect of the invention, there is provided, a method of stretching a length of tubing held under tension at ends thereof, comprising, sliding two grabbers along the tubing incrementally stretching the tubing increasing its length as the grabbers move from a mid-region towards ends thereof in opposite directions.

In accordance with another aspect of the invention, there is provided, a system for stretching a length of tubing having a mandrel therewithin comprising:
a support stage;
first and second spaced holding members for securely and releasably holding the length of tubing along a longitudinal axis, wherein the holding members are relatively movable along the longitudinal axis for lightly tensioning the tubing by applying an initial force therebetween, wherein the first and second spaced holding members are coupled to the support stage, and wherein the holding members move to a second more spaced apart position after the tubing is stretched by an applied force along the longitudinal axis while maintaining a light tension upon the tubing, wherein the light tension is such that any slack is taken up when the tubing is lengthened and wherein the light tension is less than a permanent stretching force upon the tubing.

In accordance with the invention there is further provided a method, comprising: stretching a length of tubing having a mandrel therewithin comprising; securing the tubing by holding the length of tubing about each end and maintaining it taut along a longitudinal axis when stretching; firmly gripping the tubing at two adjacent locations about a mid-region with grippers along its length and sliding the grippers along the tubing while pulling the tubing in opposite directions from the mid-region toward ends of the tubing with enough friction force to stretch the tubing upon the mandrel without tearing the tubing; and, releasing the secured tubing at both ends.

The system further comprises a controllable moveable first grabber and a controllable moveable second grabber, the first and second grabbers for grabbing a mid-region of the tubing and for sliding in opposite directions along the tubing applying a small enough frictional force when sliding.

BRIEF DESCRIPTION OF THE DRAWINGS

Exemplary embodiments of the invention will not be described in conjunction with the drawings, in which:

FIG. 5 is a drawing illustrating a manual operation for stretching the tubing on a mandrel.

FIG. 6 is a drawing similar to FIG. 5 illustrating the manual operation a second later as stretching begins.

DETAILED DESCRIPTION

Figure 1:
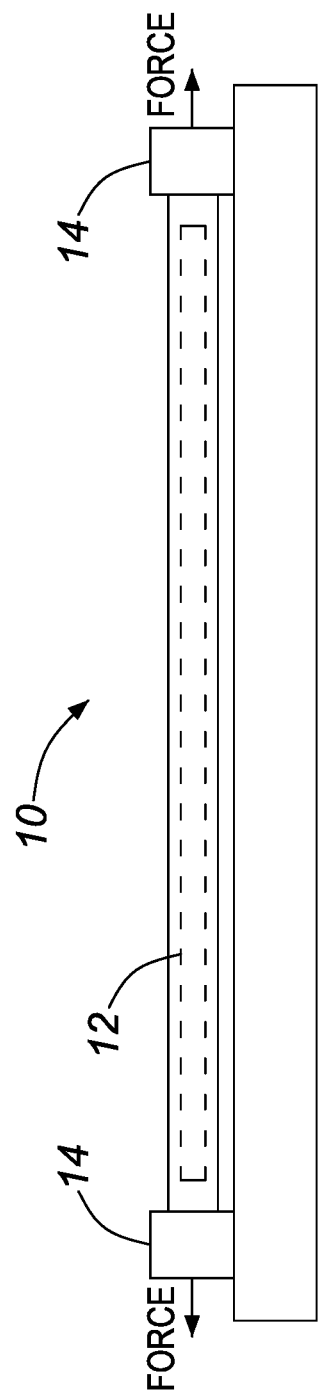
FIG. 1 is a prior art arrangement of stretching a length of surgical tubing.

Referring now to FIG. 1 a length PTFE tubing 10 is shown having a metal mandrel 12 inserted therein. The length of the mandrel 12 is less than the length of tubing and the outer diameter of the mandrel 12 is greater than the inner diameter of the PTFFE tubing. One technique of lessening the inner and outer diameter of the tubing is to secure one end of the tubing by clamping it, and pulling the other end so that it stretches on the mandrel, or alternatively pulling both ends of the tubing so as to stretch it there by lessening its inner diameter as is shown in FIG. 1. Pulling in this manner permanently stretches the PTFE material. Machines have been made which perform such pulling on lengths of PTFE tubing, however the problem with either of these techniques, is that the tubing is often damaged or tears, or develop small holes. Surgical PTFE is often manufactured to have an etched outer surface and this surface is often marred by stretching in this manner. Furthermore this pulling technique does not yield a uniform diameter tube.

Figure 2:
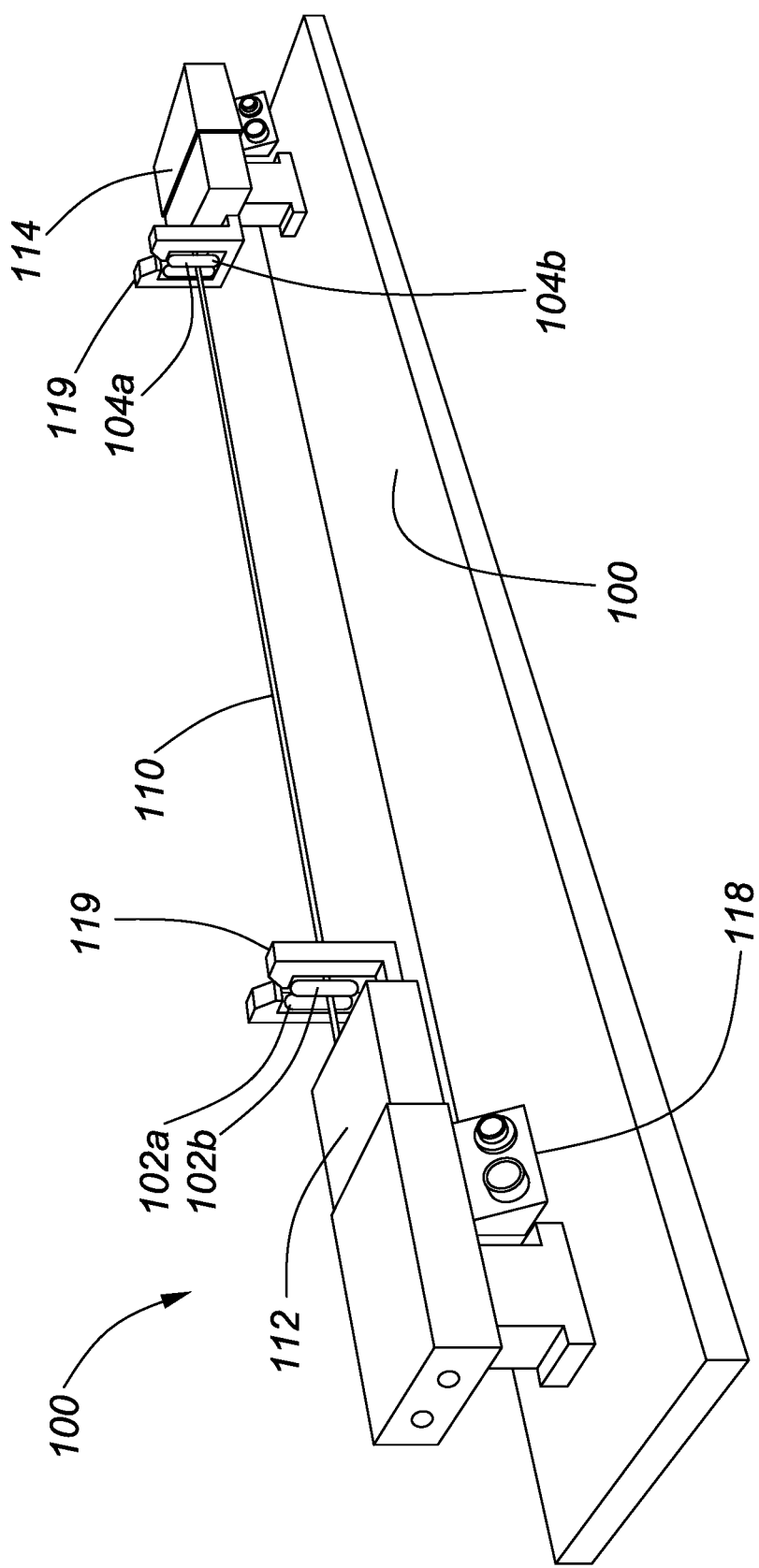
FIG. 2 is a drawing of a system shown with a secured length of surgical tubing ready to be stretched.

Turning now to FIG. 2 in accordance with the invention a support stage 100 is shown supporting a pair of movable separated holding or clamping blocks 112 and 114 having compliant inflatable fingers 102a, 102b and inflatable fingers 104a, 104b respectively for securely holding a length of PTFE tubing 110 without damaging the held ends. The fingers are secured in a metal frame 119. Prior to placing the PTFE tubing in the clamping blocks a mandrel 105 (not seen in FIG. 2) is fully inserted into the tubing. Conveniently the inflatable fingers 102a, 102b and 104a, 104b do not damage the PTFE tubing 110 while securely holding the ends thereof. The inflatable fingers 102a, 102b, 104a and 104b are controllable can both securely hold or release the tubing 110 depending on an amount of air pressure forced into them. Upon releasing the pressure applied to the fingers 102a, 102b and 104a and 104b, the tubing 110 may be removed from the clamping blocks. The clamping blocks 112 and 114 are slidably mounted the support stage 100. While air pressure is applied to the clamping blocks 112 and 114 they are forced apart, keeping the length of tubing 110 secured within the blocks taut. While the tubing 110 is stretched by grabbing members 120a and 120b the clamping blocks 112 and 114 provide a slight pulling force along the longitudinal axis of the tubing maintaining its tautness as the length of the tubing increases, however with less force than is required to permanently substantially stretch the tubing 110. The longitudinal axis is shown to be horizontal which is most convenient, but may be oriented differently, for example vertically. It is preferred not to have the clamping block stretch the tubing 110 so that its outer coating does not become damaged. When the mandrel is inserted into the tubing the tubing is already snugly fit on the mandrel. By way of example the thickness of the PTFE tubing wall is initially 0.0015" and after stretching the tube wall thins to about 0.0005"–0.0001". In thinning the wall of the PTFE tube, care must be taken to not damage the lubricious inner surface of the tube and to preserve the adhesive properties of the outer etched surface so that in can be bonded with subsequent outer layers that will be coupled to the tubing to form a catheter shaft.

Figure 3:
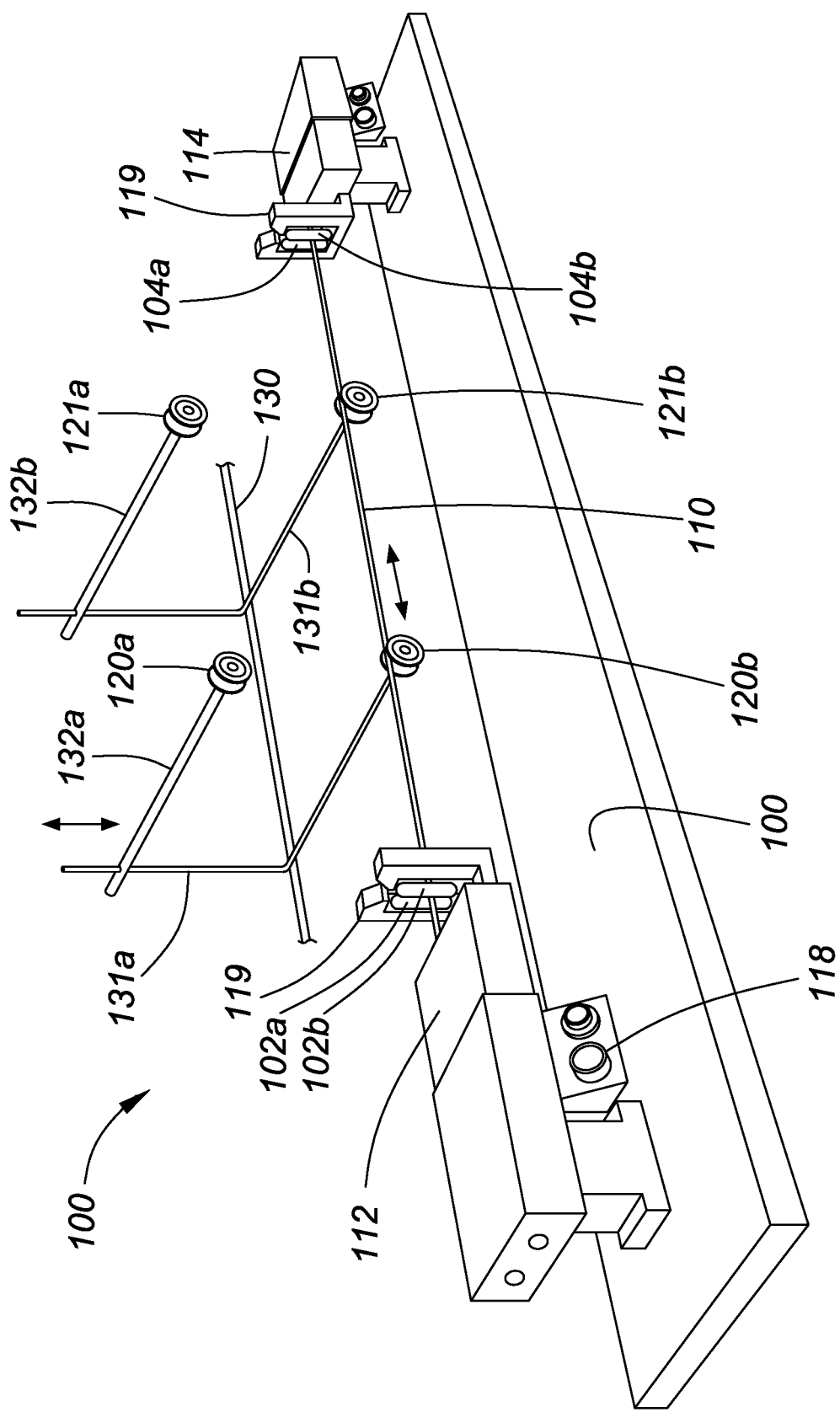
FIG. 3 is a drawing of a system similar to FIG. 2 showing grooved resistance wheels for lengthening the PTFE tubing having a mandrel therein.

FIG. 3 shows a similar support stage 100. Blocks 112 and 114 each have a movable portion which is controlled pneumatically and maintain a fixed tension upon the tubing 110 keeping it taut but not stretching it so as to permanently increase its length. It is preferable that two movable blocks are provided, however it is possible to have one block in a fixed position with the other block being moveable. In order to stretch the tubing without damaging it, a first pair of grabbing members 120a, 120b and a second pair of grabbing members 121a, 121b slidably grab the tubing at two adjacent locations, respectively, near the center of the length of tubing. The pair of members 120a and 120b are shown vertically spaced apart. In operation motors (not shown) move member 120a downward to contact the tubing 110 and 121a is also moved downward at the same time. Rollers 120a and 121a are moved upward away from the tubing when a new length of tubing with mandrel therein is loaded into the holders 102a, 102b and 104a, 104b.

Once each pair of grooved wheels or grabbers 120a, 120b and 121a, 121b engage the PTFE tube by slightly clamping down on the tubing, the pair 120a, 120b are pulled toward the fingers 102a, 102b and the pair 121a, 121b are pulled toward the fingers 104a, 104b. The engaged wheels are illustrated in alternative embodiments in FIG. 4 and FIG. 7. Because the wheels are provided with some braking or drag they slightly pull the tubing as they slide with friction along the tube. This simultaneously occurs as both pairs are pulled in opposite directions. Without some braking or resistance the wheels would merely roll along the PTFE tubing without stretching it, so enough drag/resistance or braking and upon the wheels must be present to stretch the tubing without tearing or damaging it. Thus, in operation, the two pairs of wheels move away from each other while applying a force that is great enough to incrementally stretch the tubing between the wheels while sliding along it. Because there is resistance when the wheels are pulled toward each respective end the tubing is stretched. Sliding with a friction force is required to stretch the tubing. This is illustrated more clearly in FIG. 4 where the wheels move from an upper position (shown in dashed lines for the purpose of illustration) to an engaging position where wheels 420a and 420b forming a pair of grabbers engage the tubing 410 and are pulled along the tubing by members 422 toward the holding block 412 and wheels 421a and 421b form a pair of grabbers and are pulled by members 422 in an opposite direction along the tubing toward block 414. The members 422 are motor driven although the motors and linkage is not shown. In an alternative embodiment Eddy current brakes can be provided instead of resistance wheels to controllably apply drag to the wheels which are pulled along the tubing stretching it. The braking drag or resistance on the wheels ensures a required friction force as the wheels are pulled along the tubing. The wheels move from a central position to either end. To more fully understand the principle described above, consider a luggage cart with rubber wheels being pulled along a smooth floor. If no braking is applied to the wheels they roll smoothly along the floor with little effort and no apparent resistance. If brakes are fully applied and the cart is pulled there will be considerable skidding, drag and friction. If the brakes are lightly applied there will be some drag but the cart will move in the direction it is pulled. The slightly braked wheels moving along the floor will cause some friction and some heat. Referring now to FIG. 7, or once again to FIG. 4, each pair of wheels with some induced braking or resistance causes some friction upon the tubing and stretches the tubing. The wheels partially pull the tubing along with it, thereby incrementally stretching it between the two sets of wheels as the wheels move along the tubing. Tubing behind the wheels is stretched as the wheels move in a forward direction, and tubing in front of the wheels is not yet stretched.

More specifically, in a preferred embodiment the first grabber 120*a*, 120*b* grabs the tubing near the center of its length, and grabbing lightly enough so that with a force applied toward its first end slides along the in a first direction towards the first clamping block 112 a distance D which is approximately half the length of the mandrel while simultaneously applying enough frictional force upon the tubing to incrementally stretch it so that the length of the tubing is increased at least a length L1 which is less than 0.25D. As the gripper moves along the length more of the length is stretched. It is preferred that the movement be continuous without stopping until the stretch is complete, thus incrementally stretching is in effect continuously stretching until a desired length is attained. Preferably, the same operation is performed simultaneously with the second grabber 120*b*. Thus both grabbers 120*a*, 120*b* and 121*a*,121*b* apply a frictional force upon the tubing while sliding along it thereby increasing its length by stretching it. This operation is repeated if necessary until the inner diameter of the PTFE tubing conforms to the outer diameter of the mandrel.

Once this process is complete one of the ends of the tubing 110 is released from its clamp 112 and is tied off tightly against the mandrel end, after which the other end is released from clamp 114 and is tied off as well. The shaft is now ready to have additional layers applied and be braided.

Although less preferred, a single grabber 120*a*, 120*b* can be used, instead of the pair of grabbers. In this embodiment the location of the grabber at the start of the grabbing process would be about an end of the mandrel and it would slidably grab and slide along the entire length of the mandrel. By using a pair of grabbers, a much more uniform PTFE shaft results and the creation of unwanted pin holes is avoided.

Another less preferred method however one that achieves reasonably good results and much preferable to the method of prior art FIG. 1 which stretches the tubing by pulling from both ends, is to have a human operator wearing rubberized gloves slidably grab the tubing with both hands from the center region and pull outwards toward the holding blocks. In this instance the grabber or grippers performing the grabbing is the operator's hand wearing rubberized gloves, shown in FIGS. 5 and 6. In this and the previous embodiment without a human operator, the holding blocks apply enough force keeping the workpiece taut and when the blocks 514, 614 retract and separate to a maximum position at which time a desired stretch and lessening of the diameter of the PTFE an electronically generated indicator light 118 or warning sound occurs. The indicator light 118 is not shown in FIGS. 5 and 6 however this provides an indication to the operator that the desired stretch of the tubing 510, 612 has been reached. FIG. 5 shows a pull before being started and FIG. 6 shows a more advanced position of the pull a second later. As it is shown in FIG. 6, the tubing 612 is reduced in size/thickness between the two grabbers which have been pulled in each direction toward the blocks 614. To achieve optimum results using this method the operator applies an amount of pressure squeezing the tubing at the same time a pressure which allows for simultaneous sliding and stretching so as to not over stretch it. A light squeeze or compressive force versus a clamping squeeze. It must be with enough friction to achieve a stretch that will not damage while at the same time sliding along the length in two opposite directions. Thus the tubing is stretched from a location about the center in two opposite directions toward the blocks 514 in FIG. 5, simultaneously. If too much pressure is applied the tubing will tear, if too little pressure is applied a desired stretch may not be attained. Adjustment may be necessary to achieve an optimal result.

The clamping blocks are preferably inflatable fingers at each end of the assembly utilize pneumatic bladder clamps that provide required clamping and actuating without damaging the PTFE. Constructed of a high quality, durable EPDM rubber, Pneuma-Cel bladder clamps allow for soft, conformal clamping of delicate and/or irregularly shaped parts and are optimized for high cycle life and prolonged wear.

The end blocks that apply outward force to keep the tubing taut during the stretching process are activated by pneumatic actuators whereby the pressure can be adjusted accordingly. These actuators are preferable to springs as springs would not be offer adjustability and a different spring would be required for substantially different PTFE thicknesses. The range is typically anywhere from 5 to 30 psi and is regulated with a pressure regulator maintaining a same desired force upon the tubing being held at all positions.

Figure 4:
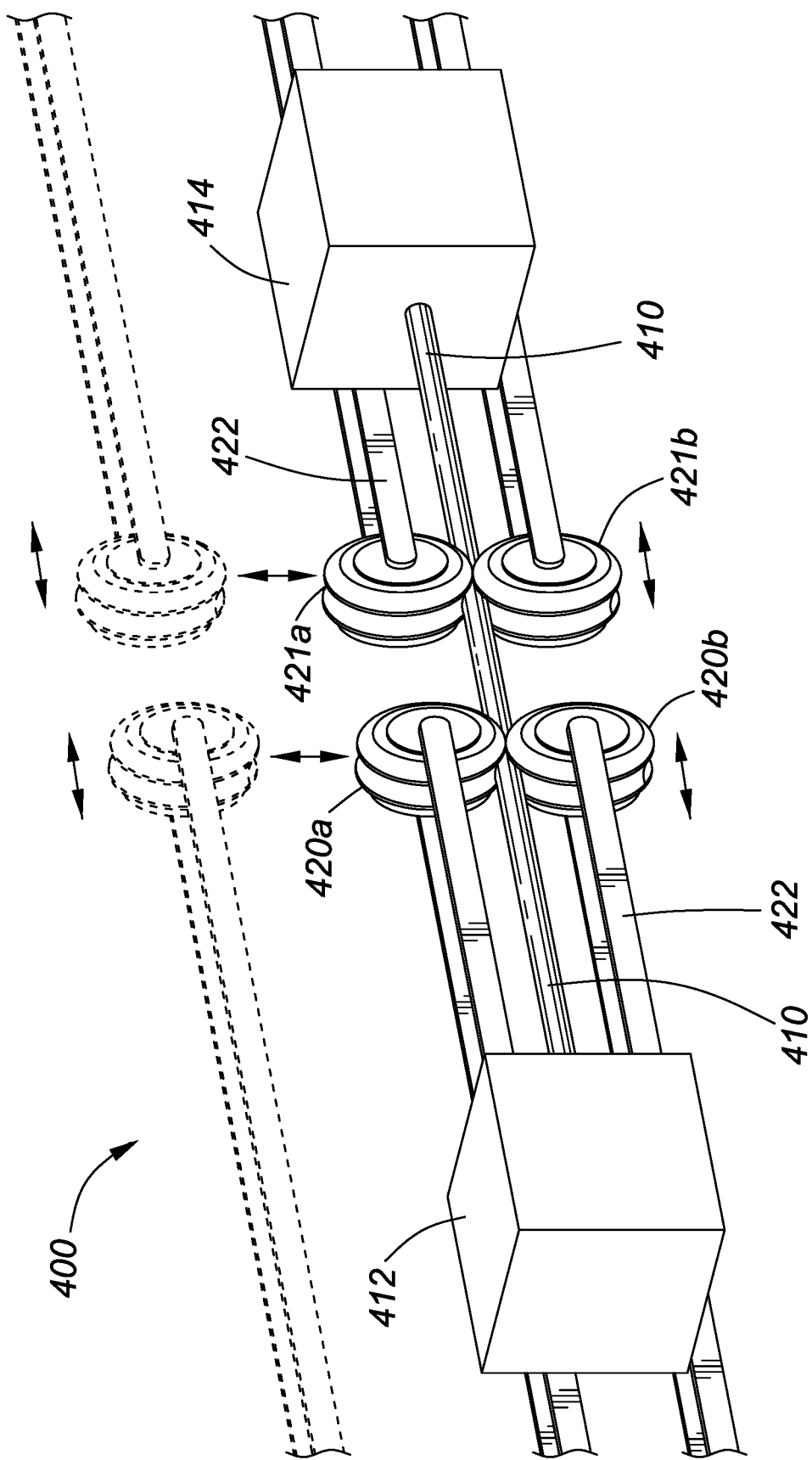
FIG. 4 is an alternative embodiment where grooved resistance wheels are linked to moveable members for stretching a length of tubing.

The grabbers can be in the form of 2 pairs of opposing silicone coated wheels 420*a*, 420*b* and 421*a*,421*b* shown as silicone u-groove pinch rollers in FIG. 4. Wheels of this type can be in the form of commercially available rotary damper wheels or rollers which provide a braking force using the Eddy Current principle. An eddy current brake, also known as an induction brake, electric brake or electric retarder, is a device used to slow or stop a moving object by dissipating its kinetic energy as heat. The braking force or braking resistance is fully adjustable by varying the electric voltage. Alternatively another form of grabber such as actuatable rubberized fingers could be used as grabbers however the friction force on the tubing would have to be controlled so as to slide and stretch the tubing simultaneously.

Figure 7:
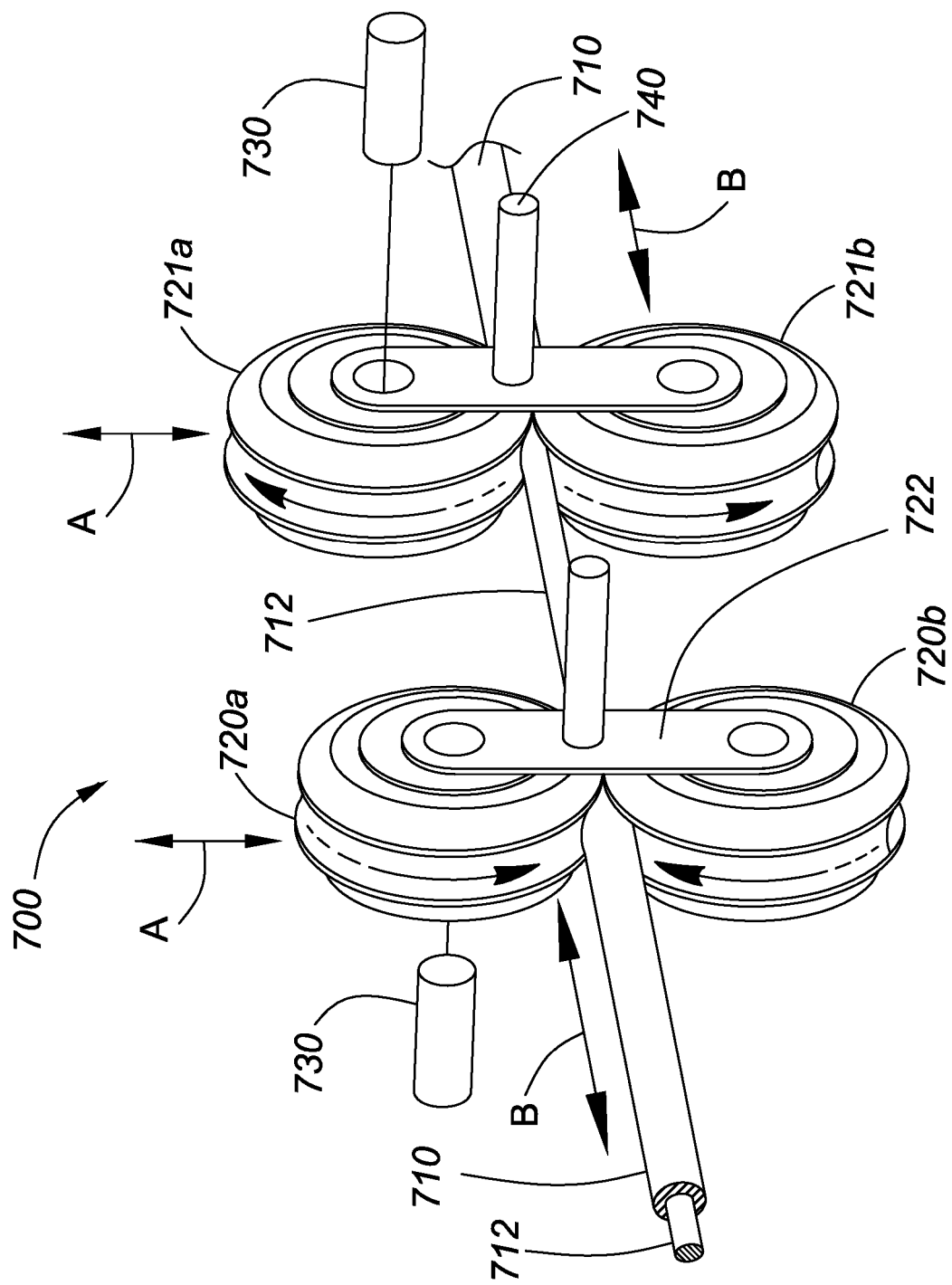
FIG. 7 is a diagram showing manually controllable grippers for stretching a length of tubing.

Referring now to FIG. 7, a system in accordance with the invention is shown wherein pairs of silicone wheels 720, 720*b* and 721*a*, 721*b* are used as grabbers. Pins 730 are removable and when removed allow the upper wheels 720*a* and 721*a* to be removed. When a new workpiece in the form of a length of tubing 710 having a mandrel 712 therein is inserted into the holders (not shown) the upper wheels can later be placed against the tubing and lower wheel counterpart so that the pairs of wheels may engage the tubing. The pins or wheel axels 730 are then inserted to securely hold the upper wheels in place. In an alternative arrangement the members 722 may be slotted to allow the upper wheels to have two positions: an engaged position and a loading position to allow for a new length of tubing to be loaded into the system. Instead of having removable pin 730, a permanent pin or axel can move into two different positions of a slot formed in 722 to allow for engagement or loading. The grabbers 720a, 720b and 721a, 721b are controllable when an operator pulls the grabbers apart by pulling handles 740 in opposite directions to roll the resistance wheels toward each end of the tubing 710 thereby stretching the tubing. Curved arrows indicate the braking or drag applied to the wheels and straight arrows show the direction in which the wheels are continuously pulled by actuators supported by a supporting stage (not shown) until a desired permanent stretch is attained.

Numerous methods have been described which stretch a length of tubing upon a mandrel to thin the tubing without causing unwanted tearing or pinholes and whereby the etching in a length of PTFE tubing is not damaged. Utilizing a sliding grip and pulling from the center of a length of tubing outward in two opposite directions, excellent results were obtained preserving the integrity of the tubing.

What is claimed is:

1. A system for stretching a length of tubing having a mandrel therewithin comprising:
 a) a support stage;
 b) first and second spaced holding members for securely and releasably holding the length of tubing along a longitudinal axis, wherein the holding members are relatively movable along the longitudinal axis for lightly tensioning the tubing by applying an initial force therebetween, keeping it taut, but not stretching it so as to permanently increase its length, wherein the first and second spaced holding members are coupled to the support stage, and wherein the holding members apply a force upon the tubing and relatively move to a second more spaced apart position as the tubing is permanently stretched by an applied force along the longitudinal axis while maintaining a light tension upon the tubing, wherein the light tension applied is such that slack is taken up as the tubing is lengthened and wherein the light tension is less than a stretching force upon the tubing that would result in a permanent stretch.

2. The system as defined in claim 1 further comprising a moveable first grabber and a moveable second grabber, the first and second grabbers for grabbing a mid-region of the tubing and for sliding in opposite directions along the tubing and in operation applying a small enough frictional force when sliding along the tubing to stretch the tubing between the first and second grabbers incrementally while sliding part.

3. The system as defined in claim 2 wherein in operation, the first and second grabbers are controllable and move simultaneously and in opposite directions along a longitudinal axis.

4. The system as defined in claim 2, wherein the first and second grabbers each comprise two controllable braking wheels or resistance wheels.

5. The system as defined in claim 2 further comprising an electronic indicator indicating when the tubing is stretched a predetermined amount.

6. A system for stretching a length of tubing having a mandrel therewithin comprising:
a support stage;
first and second spaced holding members for securely and releasably holding the length of tubing along a longitudinal axis, wherein the holding members are relatively movable along the longitudinal axis for lightly tensioning the tubing by applying an initial force therebetween, keeping it taut, but not stretching it so as to permanently increase its length, wherein the first and second spaced holding members are coupled to the support stage, and wherein the holding members apply a force upon the tubing and relatively move to a second more spaced apart position as the tubing is stretched from its mid-section by another applied force along the longitudinal axis while maintaining a light tension upon the tubing, wherein the light tension applied is such that any slack is taken up when the tubing is lengthened and wherein the light tension is less than a stretching force upon the tubing that would result in a permanent stretch.

\* \* \* \* \*